US007246644B2

United States Patent
(12) United States Patent
Colombo et al.

(10) Patent No.: US 7,246,644 B2
(45) Date of Patent: Jul. 24, 2007

(54) TYRE FOR A VEHICLE WHEEL INCLUDING SPECIFIC TREAD PATTERNS

(75) Inventors: Gianfranco Colombo, Concorezzo (IT); Mario Isola, Paderno Dugnano (IT)

(73) Assignee: Pirelli Pneumatici S.p.A., Milan (IT)

( * ) Notice: Subject to any disclaimer, the term of this patent is extended or adjusted under 35 U.S.C. 154(b) by 223 days.

(21) Appl. No.: 10/469,029

(22) PCT Filed: Feb. 18, 2002

(86) PCT No.: PCT/EP02/01692

§ 371 (c)(1),
(2), (4) Date: Feb. 3, 2004

(87) PCT Pub. No.: WO02/068222

PCT Pub. Date: Sep. 6, 2002

(65) Prior Publication Data

US 2004/0112494 A1 Jun. 17, 2004

Related U.S. Application Data

(60) Provisional application No. 60/281,790, filed on Apr. 6, 2001.

(30) Foreign Application Priority Data

Feb. 28, 2001 (EP) ................................. 01830143

(51) Int. Cl.
*B60C 11/11* (2006.01)
*B60C 11/12* (2006.01)
*B60C 11/13* (2006.01)

(52) U.S. Cl. .......................... 152/209.18; 152/209.21; 152/209.28; 152/902; 152/903; 152/DIG. 3

(58) Field of Classification Search ............. 152/209.1, 152/209.18, 209.21, 209.28, 902, DIG. 3, 152/903
See application file for complete search history.

(56) References Cited

U.S. PATENT DOCUMENTS 3,532,147 A 10/1970 Gough et al.

(Continued)

FOREIGN PATENT DOCUMENTS

DE 43 19713 * 12/1994

(Continued)

OTHER PUBLICATIONS

K. Kiichiro, "Pneumatic Tire"; Patent Abstracts of Japan, of JP 4-274907 A, Sep. 30, 1992.

*Primary Examiner*—Steven D. Maki
(74) *Attorney, Agent, or Firm*—Finnegan, Henderson, Farabow, Garrett & Dunner, L.L.P.

(57) ABSTRACT

Winter tire for vehicle wheels, provided with a tread comprising three circumferential grooves and a plurality of transverse grooves which jointly delimit four circumferential rows of blocks, namely two axially outer shoulder rows and two center rows at the sides of the equatorial plane. The transverse grooves converge on the equatorial plane in the direction of rolling specified for the tire.

In the tread, each transverse groove of the center rows is made to comprise a widening of the cross section with an essentially circular profile, formed at a distance from the ends, for trapping snow.

To obtain quieter running on dry roads, the front transverse edge profiles of the adjacent blocks of the center rows are made to comprise at least two successive curvilinear portions. These curvilinear portions are shaped in different ways and with opposite curvatures to each other, to form means of attenuating the noise arising from the impact of the tread pattern on dry roads when the tire is rolling.

50 Claims, 6 Drawing Sheets

U.S. PATENT DOCUMENTS 4,279,283 A * 7/1981 Hitzky ........................ 152/902
4,703,787 A 11/1987 Ghilardi
5,088,536 A * 2/1992 Graas et al. ................ 152/902
5,198,047 A * 3/1993 Graas et al. ........... 152/209.18
5,373,882 A * 12/1994 Nakagawa ............. 152/209.28
5,435,366 A * 7/1995 Voigt et al. ............ 152/209.18
5,759,313 A * 6/1998 Shirai et al. ........... 152/209.18
5,924,464 A 7/1999 White
6,003,574 A * 12/1999 Boiocchi et al. ....... 152/209.18
6,129,127 A * 10/2000 Nicotina ................ 152/209.18
6,378,583 B1 * 4/2002 Fontaine ................ 152/209.18
2004/0134580 A1 * 7/2004 Colombo et al. ...... 152/209.18

FOREIGN PATENT DOCUMENTS

DE 197 05 156 A1 10/1997
EP 0 485 883 A1 5/1992
EP 0 773 116 A1 5/1997
JP 60-45404 * 3/1985
JP 62-26105 * 2/1987
JP 1-95912 * 4/1989
JP 2-99409 * 4/1990
JP 2-182505 * 7/1990
JP 4-274907 * 9/1992
JP 10-006714 * 1/1998

* cited by examiner

TYRE FOR A VEHICLE WHEEL INCLUDING SPECIFIC TREAD PATTERNS

CROSS-REFERENCE TO RELATED APPLICATIONS

This application is a national-phase entry under 35 U.S.C. § 371 from International Application No. PCT/EP02/01692, filed Feb. 18, 2002, in the European Patent Office, the contents of which are relied upon and incorporated herein by reference; additionally, Applicants claim the right of priority under 35 U.S.C. § 119(a)-(d) based on patent application No. 01830143.2, filed Feb. 28, 2001, in the European Patent Office; further, Applicants claim the benefit under 35 U.S.C. § 119(e) based on provisional application No. 60/281,790, filed Apr. 6, 2001, in the U.S. Patent and Trademark Office.

BACKGROUND OF THE INVENTION

1. Field of the Invention

The present invention relates to tyres for motor vehicles, particularly for use on snow-covered ground.

2. Description of the Related Art

As is known, a tyre in its most general form comprises a carcass structure, which includes a central crown portion and two axially opposed side walls terminating in a pair of beads for securing the tyre to the rim of a wheel, a belt structure associated coaxially with the carcass structure and a tread extending coaxially around the belt structure.

The tread comprises a relief pattern, generally formed by a plurality of transverse and longitudinal grooves which, in combination, give rise to a plurality of blocks distributed in different types of configurations, for example along a central area extending across the equatorial plane and in at least two shoulder areas extending in axially opposed positions on either side of the central area.

Of particular importance for the purposes of travel on a snow-covered surface is the presence, in the blocks, of suitable sipes, in other words a closely spaced set of notches or grooves oriented essentially transversely with respect to the direction of rolling, and having small dimensions in the circumferential direction, the function of these being to collect and retain the snow in an efficient way, since it has generally been shown to be convenient to exploit the friction of snow on snow.

One type of winter tyre marketed by the applicant has, in the tread, a pair of rectilinear circumferential grooves, arranged symmetrically with respect to the equatorial plane of the tyre and spaced apart by a distance essentially equal to half of the total width of the tread.

These circumferential grooves are combined with two sets of transverse grooves, each of which extends with a progressively increasing inclination from the outer edge of the tread to a point on the equatorial plane. The transverse grooves of the two sets converge symmetrically about the equatorial plane of the tyre in a predetermined preferred direction of rolling, and have their vertices interleaved with each other alternately along the perimetric extension of the tread on the equatorial plane.

In this tread, the configuration of the transverse grooves is such as to promote good characteristics of traction because of the mutual convergence of the grooves in the direction of rolling.

The circumferential rectilinear grooves, in turn, enable water to be removed efficiently from the footprint during travel on a wet surface, thus impeding the occurrence of the well-known and dangerous effect of aquaplaning.

The traction and the overall behaviour in travel on a snow-covered surface are improved by the provision of closely spaced sipes on the blocks generated by the intersection of the longitudinal grooves with the transverse ones and by suitable rectilinear recesses, associated with the transverse grooves, in the space delimited by the two circumferential grooves, each of the said rectilinear recesses extending in the circumferential direction for a short distance from the corresponding transverse groove.

Patent EP-773,116 held by the present applicant also discloses a tyre for snow-covered surfaces, provided with a tread band in which the circumferential grooves are formed by a sequence of portions oriented obliquely with respect to the circumferential direction of the tyre; these oblique portions converge symmetrically on the equatorial plane but in the opposite direction to the direction of convergence of the transverse grooves.

Each of the oblique portions of the circumferential grooves extends between two consecutive transverse grooves and delimits the opposing circumferential edges of a centre block in one case and a shoulder block in the other case.

In this solution, each of the centre and shoulder blocks has a corner projecting into the corresponding circumferential groove with respect to the opposite corner of the block immediately following it.

In this situation, the projecting corners of the centre blocks act as teeth which provide grip on snow in traction, while the projecting corners of the shoulder blocks produce this effect during braking.

In order to increase the grip on snow, this tyre also has a recess of trapezoidal shape extending partially between two adjacent blocks in the same centre row.

This recess passes through the transverse groove between the two centre blocks and has an inner circumferential edge and an outer circumferential edge which diverge from each other at angles preferably within the range from 3° to 15°, in the opposite direction to the direction of rolling.

However, the pattern of a tread suitable for gripping on snow, being of the block type, causes a certain degree of noise on dry roads because of the successive impacts of the transverse sides of the blocks on the ground.

SUMMARY OF THE INVENTION

In considering the cited prior art, the applicant has perceived the necessity of providing a tyre for snow-covered ground which can simultaneously ensure a good grip on snow-covered ground, quiet running characteristics on dry roads, and a high wear resistance of the tread blocks.

The applicant has found that these advantages can be achieved by providing facing transverse edge profiles of the circumferentially adjacent blocks which are such as to produce, when combined in pairs, means of gripping the snow with a corrugated profile, together with variations of their profile which are such as to attenuate the impact of the block on the ground in conditions of rolling on dry roads.

A first aspect of the invention is therefore a winter tyre for vehicle wheels, comprising a carcass structure which includes a central crown portion and two axially opposed side walls; a belt structure associated coaxially with the carcass structure; and a tread extending coaxially around the belt structure, impressed with a relief pattern which comprises at least one row of blocks delimited by a pair of circumferential grooves intersected by transverse grooves.

Each block is essentially delimited by two longitudinal sides in the circumferential direction and by two transverse sides, or transverse edge profiles, one at the front and one at the rear with respect to a predetermined direction of rolling.

The principal characteristics of the said tread are as follows:

a) each transverse groove comprises an enlargement of the cross section having an essentially curvilinear profile; this enlargement of the cross section is formed in the central area of each transverse groove and is designed to trap snow;

b) each of the transverse edge profiles of the blocks comprises at least two successive curvilinear portions shaped differently from each other, to form means of attenuating the noise generated by the contact of the tread with dry roads when the tyre is rolling.

In a preferred embodiment, all the blocks of the said at least one row are identical to each other.

Preferably, the transverse edge of a block comprises two curvilinear portions arranged in a sequence which is the reverse of that of the facing transverse edge profile of a circumferentially adjacent block.

In a further embodiment, each of the transverse edge profiles of the blocks comprises a first rectilinear portion followed by two curvilinear portions.

Additionally, the two curvilinear portions are preferably formed by a first curvilinear portion which is concave towards the inside of the block and a second curvilinear portion with a curvature opposite that of the first portion.

In particular, the tyre according to the invention is characterized in that the said first curvilinear portion following the said rectilinear portion comprises two circular arcs, namely a first and a second circular arc, and the said second curvilinear portion comprises a third circular arc, the radius of the first circular arc being equal to or greater than the radius of the second and the third circular arc, and the radius of the third circular arc being equal to or greater than the radius of the second circular arc.

Preferably, the ratio between the radii of the first and the second circular arc is in the range from 1 to 6.

Additionally, the ratio between the radii of the third and the second circular arc is preferably in the range from 1 to 4.

Preferably, the second and the third circular arc are linked together by a further fourth circular arc having a radius not greater than the radius of any of the adjacent circular arcs.

In a preferred embodiment, the blocks are essentially rhomboid in shape, with a major diagonal converging on the equatorial plane at an angle in the range from 25° to 55°, and preferably not greater than 45°.

More particularly, each block is essentially in the shape of an irregular rhombus which approximates to the pointed ovoid shape of the leaves of certain plants. In one embodiment according to the invention, the tread comprises a first and a second centre row of blocks having the shape described above.

In this solution, the first centre row is located between a first circumferential groove lying in the equatorial plane and a second circumferential groove in a lateral position, while the second centre, row is located between the said first circumferential groove and a third circumferential groove in an axially opposing lateral position; the blocks are separated from each other by transverse grooves having mid-line axes inclined with respect to the equatorial plane.

Preferably, the blocks of the two centre rows are staggered circumferentially with respect to each other.

In a further solution, the mid-line axes of the transverse grooves of the two centre rows are inclined in opposite directions from each other with respect to the equatorial plane.

In a further preferred embodiment, the tyre comprises two rows of shoulder blocks at the sides of the centre rows.

A first row of shoulder blocks is positioned between the second circumferential groove and a first edge of the tread, while the second shoulder row is positioned between the third circumferential groove and the opposite edge of the tread; the blocks of each shoulder row are separated from each other circumferentially by transverse grooves.

Preferably, each of the blocks of the shoulder rows has its shape delimited by longitudinal sides parallel to the equatorial plane, by transverse sides and by a curvilinear linking profile between the axially inner longitudinal side and the rear transverse side. Preferably, the said transverse sides have a curvilinear shape.

Preferably, the centre and shoulder blocks have curvilinear linking portions which are opposite each other along the lateral circumferential grooves.

Advantageously, the said curvilinear linking portions which are opposite each other form a widening of the circumferential groove intended to trap snow.

Preferably, the centre and shoulder blocks comprise a plurality of sipes oriented parallel to each other within each block.

Even more preferably, in each row of blocks the sipes of each block are oriented in directions different from the direction of the transverse grooves.

It has been found that this difference between the orientation of the directions of the sipes and the transverse grooves improves traction on snow and does not adversely affect the quiet running of the tyre on dry roads.

BRIEF DESCRIPTION OF THE DRAWINGS

Further characteristics and advantages will be made clearer by the following description of an example of a preferred embodiment of a tyre according to the invention, provided for guidance and without restrictive intent, with reference to the attached drawings, in which.

DETAILED DESCRIPTION OF THE EMBODIMENTS

Figure 1:
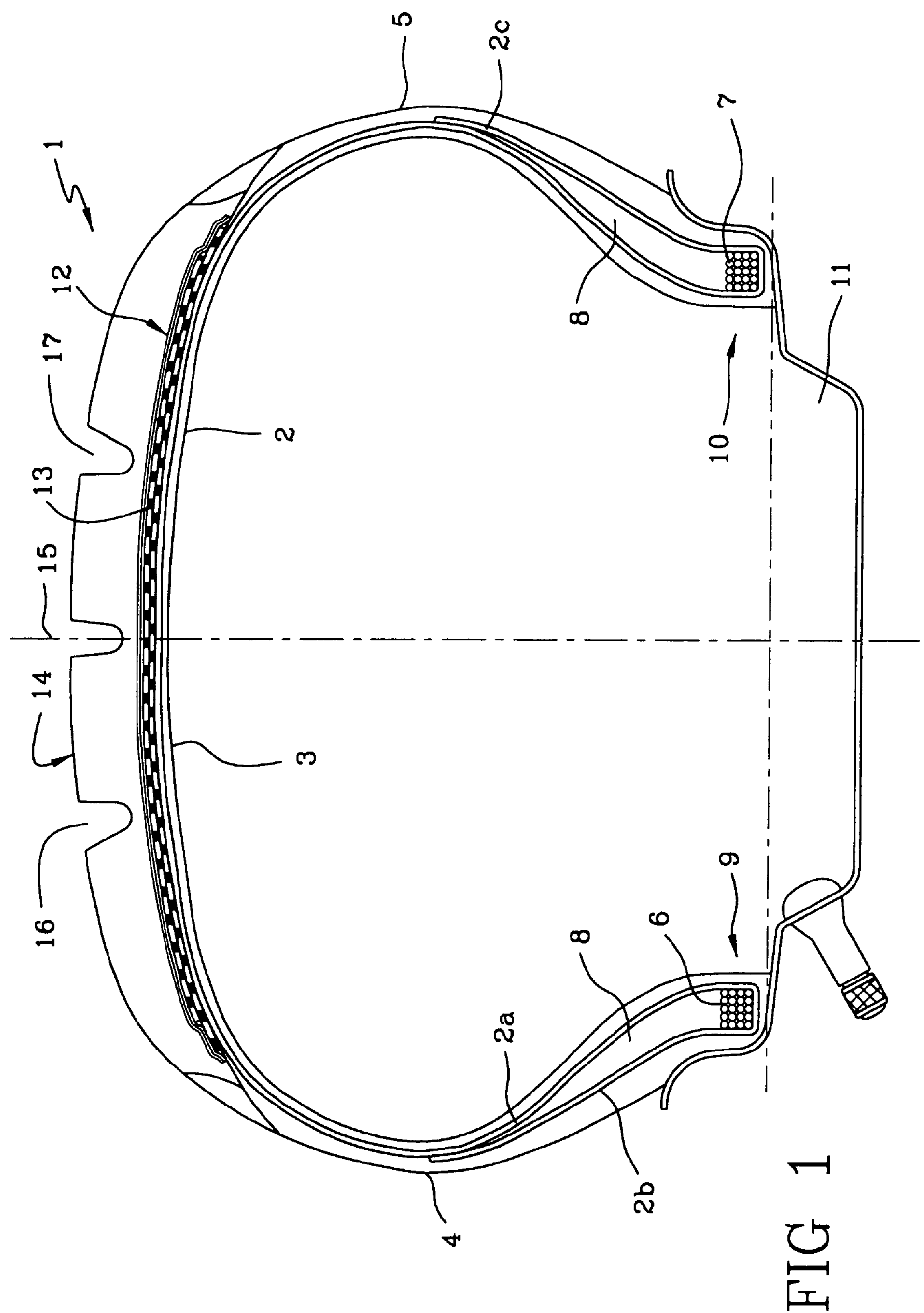
FIG. 1 shows a partial cross-sectional view of a tyre according to the invention.

With reference to FIG. 1, the number 1 indicates in a general way a tyre for motor vehicles according to the invention, for example a tyre of the 195/65 R 15 grade.

The tyre 1 comprises a carcass structure 2, including a central crown portion 3 and two side walls 4, 5, the said carcass structure 2 being provided with a reinforcing ply **2*a* whose opposite ends 2*b*, 2*c* are associated with corresponding bead wires 6, 7 located at the radially inner sides of the said side walls 4, 5. In the illustrated case, the ends of the ply are wound around the said bead wires, and in this case an elastomeric filler 8 is applied to the radially outer perimetric edges of the bead wires 6, 7, to occupy the space formed between the reinforcing ply 2***a* and the corresponding ends 2*b*, 2*c* of the reinforcing ply 2*a*.

As is known, the opposing areas of the tyre 1, each comprising a bead wire 6, 7 and the filler 8, form what are known as beads, indicated as a whole by 9 and 10, intended to secure the tyre 1 on a corresponding mounting rim 11 of the wheel of a vehicle.

A belt structure 12, comprising one or more reinforcing plies 13 made from textile or metal cords incorporated in a specified mixture, is associated coaxially with the aforesaid carcass structure 2.

Figure 2:
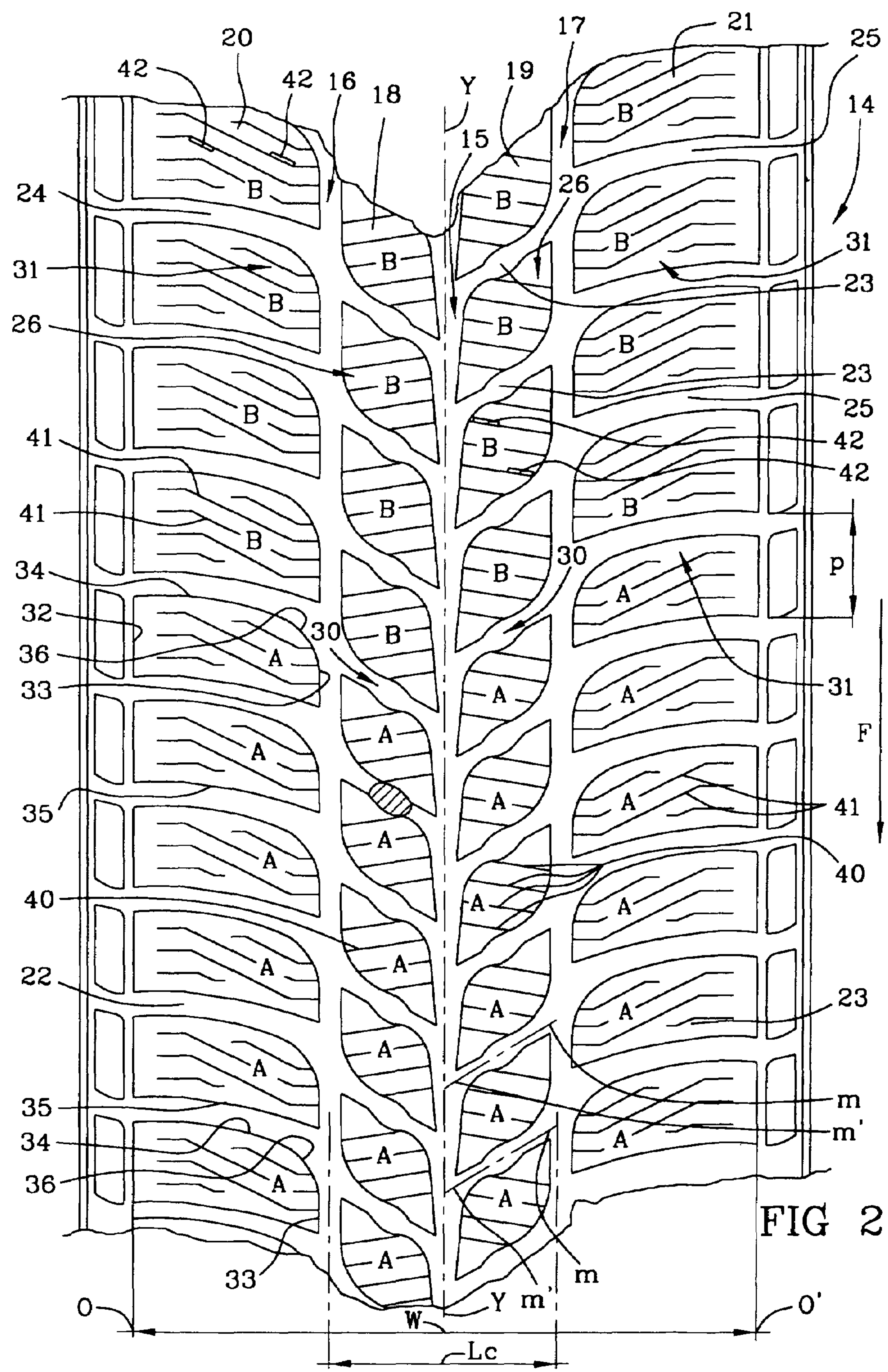
FIG. 2 shows a partial development, in plan view, of the tread of the tyre of FIG. 1.

A tread 14, in the thickness of which a pattern shown in more detail in FIG. 2 is cut, is applied in a known way to the belt structure 12.

The tread according to the invention is particularly suitable for snow-covered surfaces.

The tread 14 comprises three circumferential grooves, namely one groove (15) located in the central position, along the equatorial plane, and two lateral grooves 16, 17. The intersection between the said circumferential grooves and a plurality of transverse grooves 22, 23, 24, 25 delimits four circumferential rows of blocks, namely two centre rows 18, 19 lying across the equatorial plane and two shoulder rows 20, 21 located on opposite sides of the centre row of blocks.

The transverse grooves 22, 23 delimiting the blocks of the centre rows 18, 19 have, for each row, mid-lines m'-m inclined at equal angles to the equatorial plane, and the grooves of the two rows converge on the equatorial plane in the direction of rolling shown by the arrow H in FIG. 2.

These transverse grooves of the centre rows intersect the lateral circumferential grooves 16, 17 and continue to form the transverse grooves 24, 25 of the shoulder rows 20, 21.

The circumferential grooves 15, 16, 17 have mid-line axes essentially parallel to the equatorial plane: preferably these grooves have a depth in the range from 4 to 12 mm.

The width of the lateral circumferential grooves 16, 17 is preferably in the range from 2 to 10 mm, more preferably from 4 to 8 mm; the width of the central circumferential groove 15 between the blocks of the two centre rows is preferably in the range from 2 to 8 mm, and preferably from 4 to 6 mm.

It is specified at this point that the term "width" denotes the opening of the groove, in other words the axial distance between the straight lines tangent to the inner edges of the groove.

The transverse grooves 22, 23 preferably have a depth in the range from 4 to 10 mm. Preferably they have a maximum width in the range from 2 to 5 mm.

The transverse grooves 24, 25 preferably have a depth in the range from 4 to 10 mm. Preferably they have a maximum width in the range from 4 to 9 mm.

Preferably, both the transverse grooves and the circumferential grooves have an equal depth, for example a depth of 8 mm in the tyre considered here.

In the following text, for the sake of simplicity, only the part of the tread 14 of FIG. 2 located to the left of the equatorial plane Y-Y will be described in detail, since the part located to the right of the said plane is identical to the left-hand part rotated through 180° about the equatorial plane and shifted by a predetermined amount in the circumferential direction.

The blocks will now be described; it should be noted that each block comprises two longitudinal sides and two transverse sides, called the front and rear sides according to the direction of travel.

The blocks 26 of the centre rows 18, 19 are inscribed in a regular parallelogram formed by longitudinal sides which are essentially parallel to the equatorial plane and by transverse sides which are inclined at equal angles to the equatorial plane, although they depart from this profile in the way described below.

Preferably, the axially inner longitudinal sides are spaced apart from the equatorial plane by a distance equal to half of the width of the said central groove.

More precisely, as shown clearly in FIG. 3, the block 26 of the centre row departs from the shape of a regular parallelogram delimited by longitudinal sides "a" and "b", transverse sides "c" and "d" and diagonals $\mathbf{1}_2$ and $\mathbf{1}_1$ in the following ways:

- the axially outer longitudinal side of the block is aligned with the outer side "a" of the parallelogram and its length is shorter than this side of the parallelogram, being preferably not more than 75% of the length "a";
- the axially inner longitudinal side is inclined at an angle $\alpha$, in the range from 5° to 18°, to the equatorial plane;
- the transverse sides have a portion of predetermined length, preferably not exceeding 35% of "c", in common with the corresponding sides "c" and "d" of the parallelogram;
- the maximum linear extension of the block coincides with the longer diagonal $\mathbf{1}_1$ of the parallelogram; this diagonal is inclined with respect to the equatorial plane at an angle $\delta$, preferably in the range from 25° to 55°;
- the maximum transverse dimension is smaller than the length of the shorter diagonal $\mathbf{1}_2$ of the parallelogram and is preferably not greater than 75% of $\mathbf{1}_2$;
- the overall shape is a pointed ovoid shape enclosed in a parallelogram in which the ratio $\mathbf{1}_2/\mathbf{1}_1$ between the minor diagonal and the major diagonal is preferably in the range from 0.50 to 0.70.

It should be noted that the transverse sides of the centre blocks are of a special design, in that each of them is formed by a profile comprising at least three portions, all shaped differently from each other.

Figure 4:
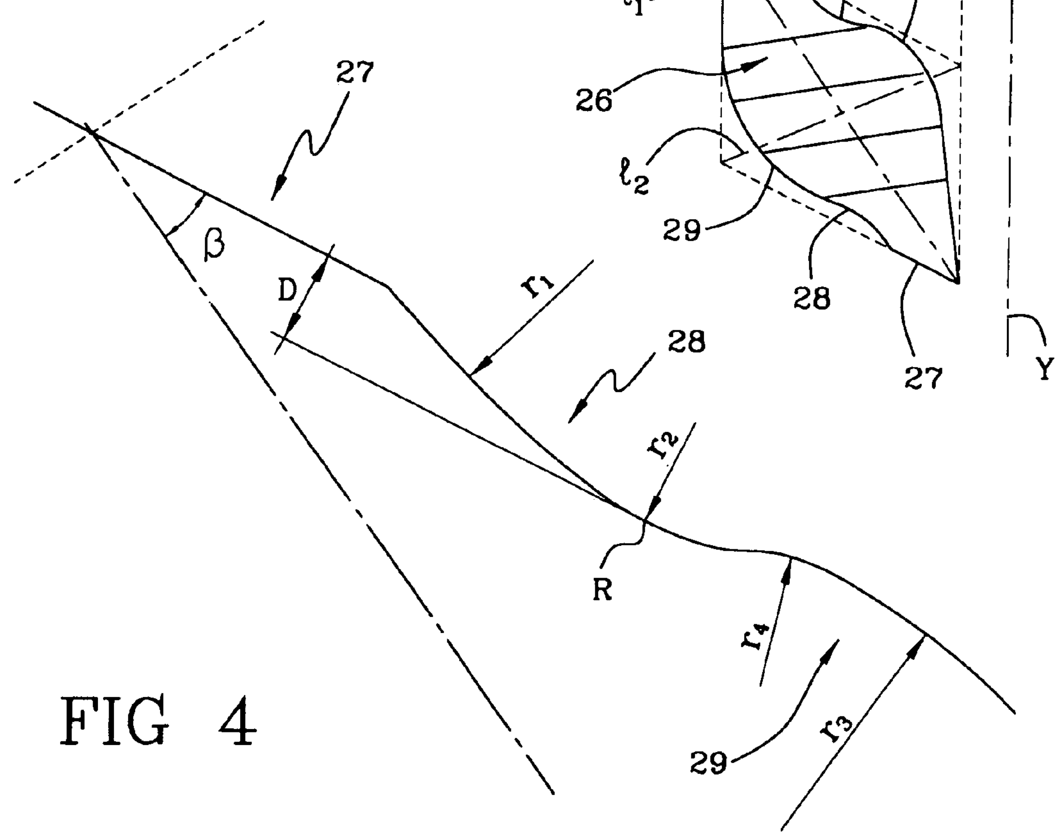
FIG. 4 shows some details of a portion of a block illustrated in FIG. 3.

As shown clearly by the enlargement in FIG. 4, the transverse edge profile "c" of the centre block 26 comprises a first rectilinear portion 27 and two successive curvilinear portions 28, 29, of which one is concave and the other is convex towards the outside of the block.

The first rectilinear portion 27 is inclined with respect to the diagonal $\mathbf{1}_1$ at an angle $\beta$ in the range from 20° to 35°.

In a first embodiment, these successive curvilinear portions are parabolic arcs.

In a different embodiment, both the first and the second curvilinear arc are shaped in the form of circular arcs.

More precisely, the first curvilinear portion 28 comprises two circular arcs, namely a first and a second, having radii of $r_1$ and $r_2$ respectively, and the second curvilinear portion 29 comprises a third circular arc having a radius $r_3$.

Preferably, the first and the second curvilinear portions are linked together by a fourth circular arc having a radius $r_4$.

Preferably, the configuration of the transverse edge profile of the block 26 has the following additional characteristics:

- the ratio between the radius $r_1$ of the first and the radius $r_2$ of the second circular arc is in the range from 1 to 6;
- the ratio between the radius $r_3$ of the third and the radius $r_2$ of the second circular arc is in the range from 1 to 4;
- the link radius $r_4$ is smaller than any of the other radii;

the distance "q" between the first rectilinear portion and the parallel line tangent to the second circular arc at the point R of maximum extension of the cavity formed by the said curvilinear portion 28, measured perpendicularly to the said rectilinear portion, is in the range from 1 to 3 mm.

Figure 3:
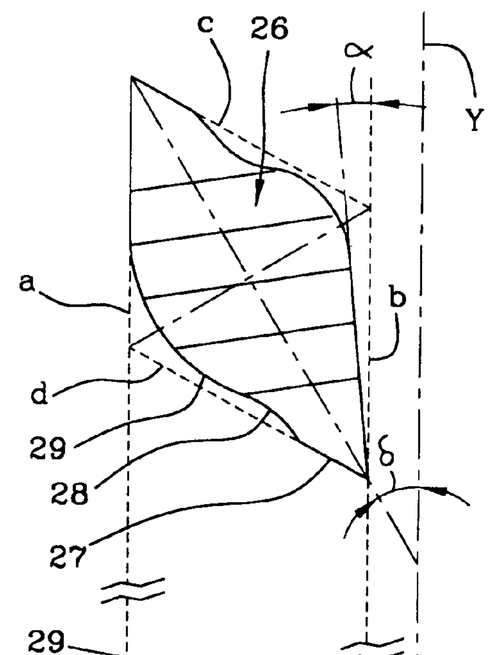
FIG. 3 shows an enlargement of a portion of FIG. 2.

If we now go on to examine FIG. 2 in combination with FIG. 3, it will be noted that the three different portions 27, 28, 29 of a transverse edge profile of a given block 26 have a sequence which is the inverse of that of the facing transverse edge profile of an adjacent block of the same row; this characteristic enables a widening of the cross section 30 to be formed in each transverse groove 22, 23. This widening has a curvilinear shape, preferably of the circular type, in an area essentially equidistant from the ends of the transverse groove 22, 23.

It has been found that the curvilinear shape of the widening of the cross section 30 advantageously maintains a sufficient resistance of the elastomeric material to tearing and abrasion (wear) in the block.

Additionally, this widening of cross section 30 advantageously forms a gripping means which is particularly suitable for trapping snow, as shown by the hatching in FIG. 2.

Preferably, these widenings of the cross section are all of the same size.

If we now go on to examine the characteristics of the blocks of the lateral rows, it will be noted that these can have various shapes which are different from those described above.

The block shape which is most convenient for the purposes of the invention is that shown in FIG. 2. In greater detail, each block 31 of the shoulder rows 20, 21 is delimited by longitudinal sides 32, 33 which are essentially parallel to the equatorial plane, by transverse sides 34, 35 with a curvilinear form and by a curvilinear linking profile 36 between the axially inner longitudinal side and one of the transverse sides. Preferably, the said curvilinear profile 36 is a circular arc.

In the example in FIG. 2, the curvilinear profile 36 forms a link between the longitudinal side 33 and the transverse side which is at the rear with respect to the direction of advance of the tyre.

The shoulder blocks 31 follow each other circumferentially with a predetermined interval "p" which is preferably in the range from 20 mm to 40 mm.

Additionally, the centre blocks 26 and the adjacent shoulder blocks 31 are staggered circumferentially with respect to each other by a distance preferably equal to approximately 50% of the mean interval. Preferably, as seen in the enlargement of FIG. 5, this staggering is carried out in such a way that the curvilinear link 36 between one side and one longitudinal side of the shoulder block 31 is opposite the curvilinear link 36' between one longitudinal side and one transverse side of the centre block 26.

Figure 5:
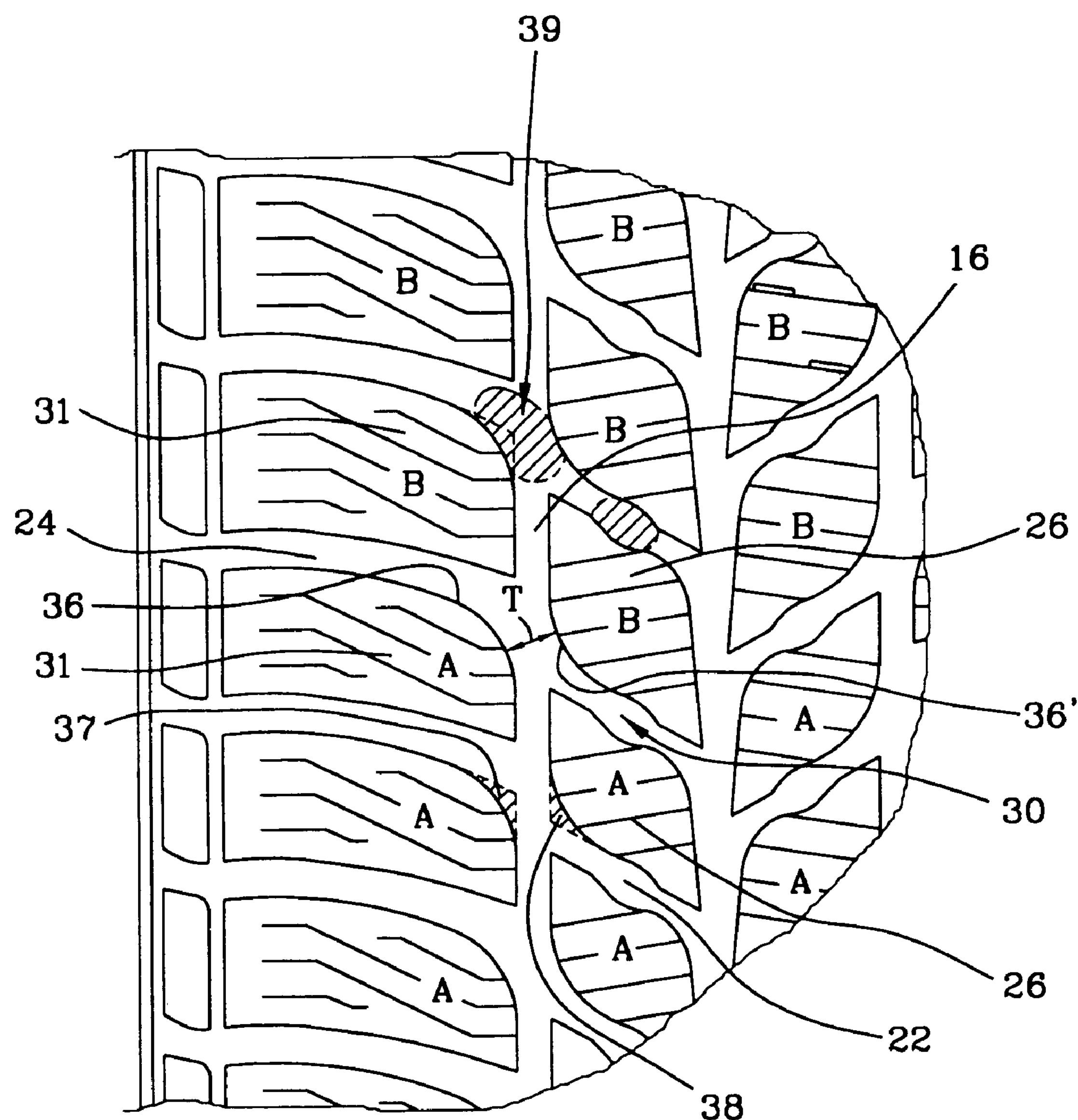
FIG. 5 shows an enlargement of some parts of FIG. 2.

In FIG. 5, "T" indicates the distance between the said curvilinear links 36, 36'.

In practice, the centre and shoulder blocks are designed with curvilinear links which make their shapes depart from those of blocks in the form of acute-angled rhombuses.

Essentially, the aforesaid links remove from the blocks 26, 31 the quantity of elastomeric material corresponding to the areas 37, 38 shown by hatching in FIG. 5.

Advantageously, this design and arrangement of the blocks provides a localized widening of the lateral circumferential groove 16, 17 and, therefore, a more suitable grip of the snow, as shown schematically by hatching in the area 39 of FIG. 5.

In order to optimize the grip of the tread on snow-covered ground, each of the centre and shoulder blocks is provided with a plurality of incisions, known to those skilled in the art as "sipes".

Preferably, the sipes within the blocks of each row are parallel to each other, with an orientation different from the direction of the transverse grooves of the same row; preferably, this orientation is in the opposite direction, with respect to the equatorial plane, to that of the said transverse grooves.

It has been found that this arrangement improves the grip on snow without adversely affecting the quiet running of the tyre on dry roads.

In greater detail, the centre blocks 26 comprise sets of sipes 40, parallel to each other in each block, inclined in the opposite direction to the transverse grooves 22, 23 with respect to the equatorial plane, at an angle $\gamma$ preferably in the range from 0° to 30° with respect to the axial direction.

In turn, each of the shoulder blocks 31 preferably comprises a plurality of sipes 41, each comprising three successive portions shaped in the form of a three-part broken line with the central portion inclined with respect to the equatorial plane, and having a direction opposite that of the sipes 40 of the blocks of the adjacent centre row; the angle of inclination of the said central portions of the sipes 41 with respect to the equatorial plane is preferably in the range from 0° to 45° with respect to the axis of rotation.

In order to reduce noise, the sipes of the centre and shoulder blocks on the same side of the equatorial plane are inclined in the opposite direction (FIG. 2) to those of the blocks of the corresponding rows located on the other side of the equatorial plane.

Also in order to optimize the grip of the tread on snow-covered roads, the shoulder and centre blocks can also comprise notches 42 (FIG. 7) located along the axially outer longitudinal sides of the shoulder blocks.

Preferably, the said notches are located on extensions of the adjacent portions adjacent of corresponding sipes or are parallel to them.

These notches are preferably deeper and a wider than the said sipes; in an example of embodiment, the notches 42 have a width and a depth of 2 mm and the ratio between the depth of the notches and that of the sipes is preferably in the range from 0.20 to 0.60. In the previously mentioned tyre, this value is 0.25.

The tyre according to the invention has made it possible to decrease the running noise on dry roads.

It is considered that one of the factors which may have contributed to the achievement of quieter running may be the particular profile of the transverse sides of the centre blocks.

Figure 6:
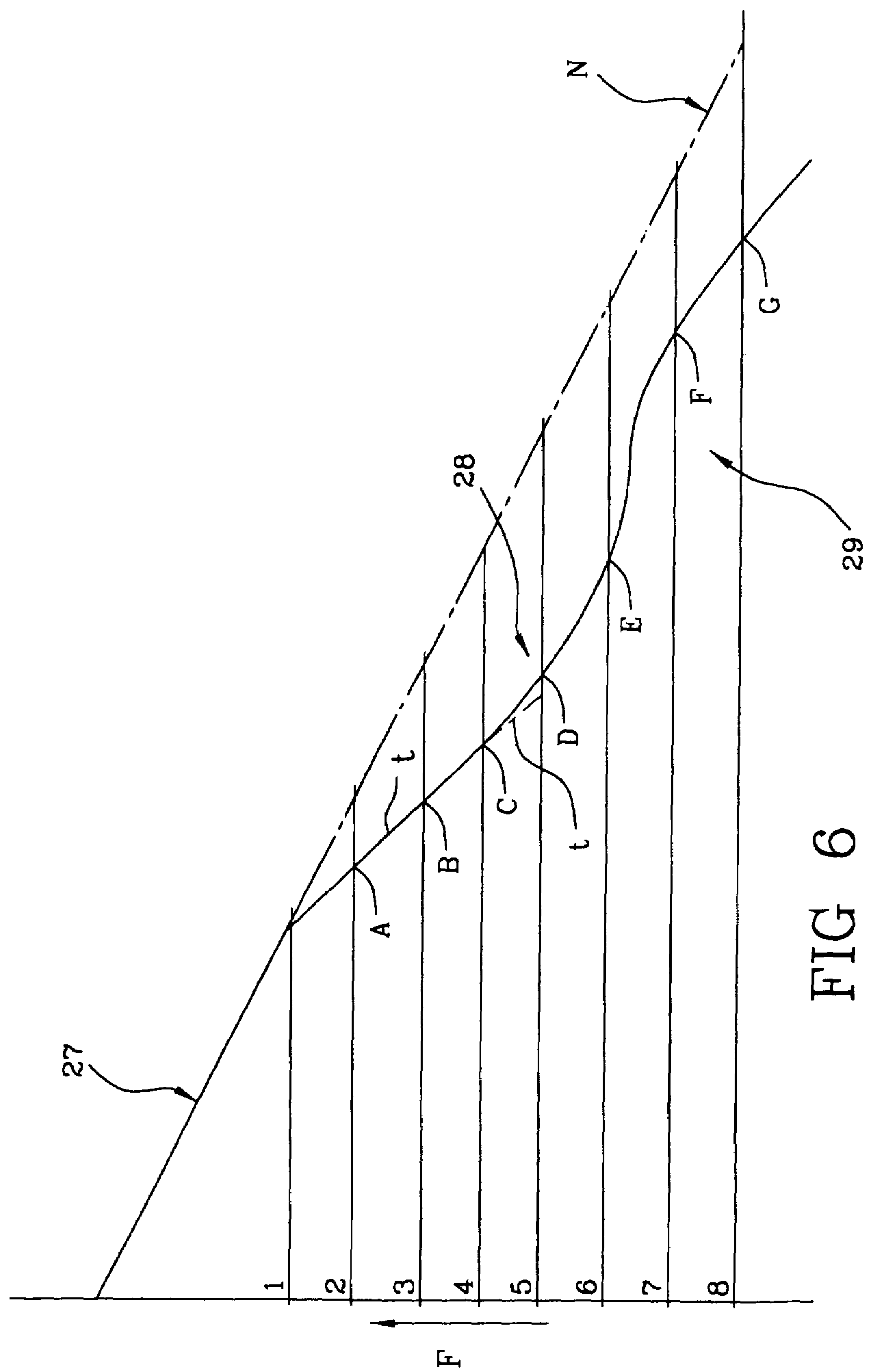
FIG. 6 shows a comparison between the transverse edge profile of a block according to the invention and that of a known block.

To provide a better understanding of the possible improvements in quietness, FIG. 6 shows the transverse edge profile of a conventional block with a rectilinear profile N and that of a block according to the invention, in the condition in which successive points of these profiles touch the ground during the progressive advance of the tyre in the direction of rolling H.

The progressive advance of the tyre on the ground is represented by the lines 101-108, which are all at equal distances from each other.

As can be seen, the block having a rectilinear transverse edge profile comes into contact with the ground via consecutive portions of identical shape and length; therefore, portions of the front profile of the block strike the ground in succession at a single specific frequency which forms a source of noise.

It may be noted that, in the tyre according to the invention, the contact with the ground initially involves portions of identical shape and length, such as AB, BC, followed by a portion CD which differs in both shape and length from the preceding portions, then by a portion DE which is different from and longer than the preceding ones, then by a portion EF with a configuration and linear dimension which is even greater than the preceding ones, and in any case has a completely different profile, and finally by a portion FG which is different from and shorter than the preceding one.

Essentially, it can be asserted that the impact of the transverse edge profile of the block according to the invention does not give rise to a repetitive phenomenon such as that found in the case of a rectilinear transverse edge profile N.

It is likely that this characteristic is responsible for the quieter running which has been found.

A further advantage of the invention is provided by one of the preferred embodiments in which the tread pattern of FIG. 2 is combined with a predetermined axial width of the centre and shoulder rows of the tread pattern.

If W indicates (FIG. 2) the total axial width of the tread between the shoulder separating recesses O, O' of the tyre, it is convenient to make the axial width $L_c$ of the centre rows smaller than that of the shoulder rows.

Preferably, the ratio $L_c/W$ does not exceed 0.45.

If the portion of tread containing the centre rows is made with the aforesaid axial width $L_c$, the longitudinal hinges represented by the lateral circumferential grooves 16, 17 are shifted towards the equatorial plane (FIG. 2).

With this solution, it has been found possible to improve simultaneously both the traction on snow and the behaviour of the tyre, as well as its quietness on dry roads, without degrading the resistance to wear.

It should be noted that the invention comprises further alternative embodiments in addition to those described above.

To give a clearer picture of the possible embodiments of the invention, reference will now be made to the tread illustrated in FIG. 7, in which the same reference numbers indicate identical elements which have already been described in the preceding figures.

Moving on to a more detailed examination, it will be noted that the variant illustrated in FIG. 7 differs from that illustrated in FIG. 2 in the following characteristics:

- the mid-line axes of the transverse grooves of the two centre rows 18, 19 are inclined in the same direction with respect to the equatorial plane;
- the sipes 40 of the blocks 26 of the two centre rows run in the same direction with respect to the equatorial plane;
- the blocks of one shoulder row 20, when rotated through 180° about the axial direction, match the blocks of the second shoulder row 21.

Figure 7:
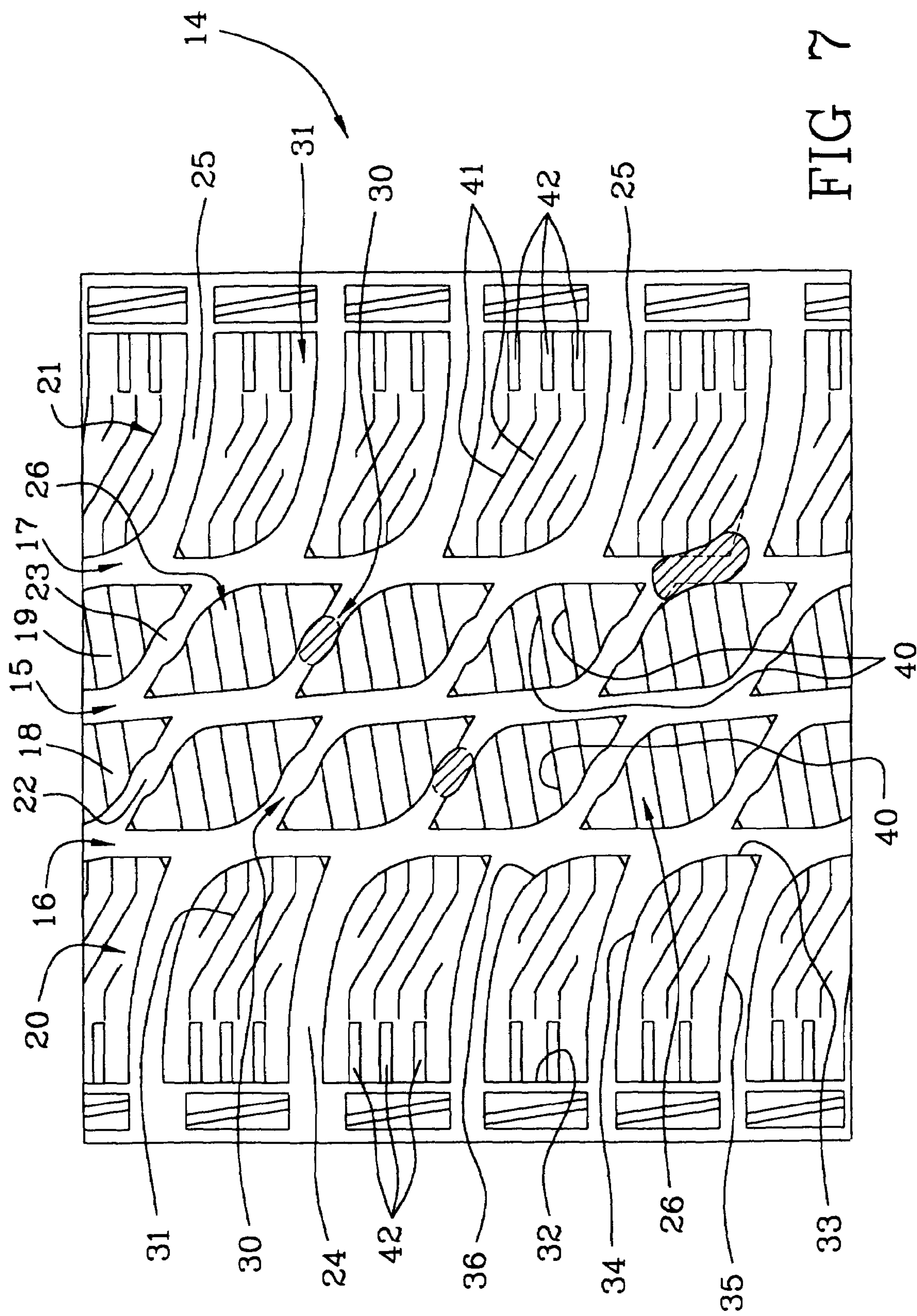
FIG. 7 shows a variant of the pattern of the tread of FIG. 2.

According to a previously described embodiment, the variant in FIG. 7 shows a plurality of notches 42 which help to trap snow at the end of each shoulder block.

These notches are distributed in an essentially uniform way, with an orientation which in some solutions, such as that of FIG. 7, can lie perpendicularly to the equatorial plane.

In further embodiments, which can be easily derived from the above description and are therefore not illustrated, the tread can comprise two further intermediate rows of blocks, preferably also of pointed ovoid shape, located between the two central rows and the two lateral rows shown in FIG. 2.

In other words, the design and arrangement of the blocks of the intermediate rows can again be such that the aforesaid localized widening of the transverse grooves and/or the circumferential grooves is produced, thus providing a better grip on snow, the whole being as shown schematically by the hatched areas in FIG. 5.

It should be noted, however, that the blocks of the intermediate rows could have configurations different from those of the blocks of the centre rows, or could have polygonal profiles different from those described.

The invention claimed is:

1. A tyre for a vehicle wheel, the tyre being configured to be rolled on a contact surface, comprising:

a carcass structure;

a belt structure associated coaxially with the carcass structure; and a tread extending coaxially around the belt structure;

wherein the carcass structure comprises a central crown portion and two axially-opposed sidewalls, wherein the tread comprises a relief pattern comprising at least one row of blocks delimited by a pair of circumferential grooves intersected by transverse grooves, wherein each block of the at least one row is essentially delimited by two longitudinal sides in a circumferential direction of the tyre, wherein each block of the at least one row is essentially delimited by two transverse sides, a front side and a rear side with respect to a predetermined rolling direction of the tyre, wherein each of the transverse sides of each block of the at least one row comprise at least two successive curvilinear portions shaped differently from each other, wherein an edge profile of each of the transverse sides comprises a rectilinear portion followed by the at least two successive curvilinear portions, wherein each transverse groove comprises a widened cross-section of essentially-curvilinear shape, and wherein each widened cross-section is disposed in an area essentially equidistant from ends of a respective transverse groove.

2. The tyre of claim 1, wherein each block of the at least one row comprises an identical shape.

3. The tyre of claim 1, wherein the at least two successive curvilinear portions comprise a first curvilinear portion, concave toward an inside of a respective block, and a second curvilinear portion, with a curvature opposite to that of the first curvilinear portion.

4. The tyre of claim 1, wherein a transverse edge profile of each block of the at least one row comprises two successive curvilinear portions whose shape is an inverse of two successive curvilinear portions of a facing transverse edge profile of a circumferentially-adjacent block of the at least one row.

5. The tyre of claim 1, wherein the at least one row of blocks is contained in at least one row of rhombuses, wherein each rectilinear portion is inclined at an angle greater than or equal to 20° and less than or equal to 35° with respect to a longer diagonal of a respective rhombus.

6. The tyre of claim 1, wherein the at least two successive curvilinear portions comprise a first curvilinear portion, concave toward an inside of a respective block, and a second curvilinear portion, with a curvature opposite to that of the first curvilinear portion.

7. The tyre of claim 6, wherein the first curvilinear portion is a parabolic arc, and wherein the second curvilinear portion is also a parabolic arc.

8. The tyre of claim 1, wherein the at least two successive curvilinear portions comprise a first curvilinear portion and a second curvilinear portion, wherein the first curvilinear portion comprises a first circular arc and a second circular arc, wherein the second curvilinear portion comprises a third circular arc, wherein a radius of the first circular arc is greater than a radius of the second circular arc, wherein the radius of the first circular arc is greater than a radius of the third circular arc, and wherein the radius of the third circular arc is greater than the radius of the second circular arc.

9. The tyre of claim 8, wherein the first curvilinear portion forms a concavity, and wherein a perpendicular distance between the rectilinear portion and a line both parallel to the rectilinear portion and tangent to the concavity is greater than or equal to 1 mm and less than or equal to 3 mm.

10. The tyre of claim 8, wherein a ratio of the radius of the first circular arc to the radius of the second circular arc is greater than or equal to 1 and less than or equal to 6.

11. The tyre of claim 8, wherein a ratio of the radius of the third circular arc to the radius of the second circular arc is greater than or equal to 1 and less than or equal to 4.

12. The tyre of claim 8, wherein the second circular arc and the third circular arc are linked together by a fourth circular arc, and wherein a radius of the fourth circular arc is not greater than a radius of any adjacent circular arcs.

13. The tyre of claim 8, wherein the second circular arc and the third circular arc are linked together by a fourth circular arc, wherein a radius of the fourth circular arc is less than the radius of the first circular arc, wherein the radius of the fourth circular arc is less than the radius of the second circular arc, and wherein the radius of the fourth circular arc is less than the radius of the third circular arc.

14. The tyre of claim 1, wherein the blocks of the at least one row are essentially rhombus-shaped.

15. The tyre of claim 14, wherein a longer diagonal of the essentially rhombus-shaped blocks forms an angle greater than or equal to 25° and less than or equal to 55° with respect to an equatorial plane of the tyre.

16. The tyre of claim 1, wherein the blocks of the at least one row are essentially rhomboid-shaped.

17. The tyre of claim 16, wherein a longer diagonal of the essentially rhomboid-shaped blocks forms an angle greater than or equal to 25° and less than or equal to 55° with respect to an equatorial plane of the tyre.

18. The tyre of claim 1, wherein axially-outer longitudinal sides of each block of the at least one row are parallel to an equatorial plane of the tyre.

19. The tyre of claim 1, wherein axially-inner longitudinal sides of each block of the at least one row form angles greater than or equal to 5° and less than or equal to 18° with respect to an equatorial plane of the tyre.

20. The tyre of claim 1, wherein the at least one row of blocks is contained in at least one row of parallelograms, wherein axially-inner longitudinal sides of the parallelograms are parallel to an equatorial plane of the tyre, wherein the axially-inner longitudinal sides of the parallelograms are equidistant from the equatorial plane of the tyre, wherein axially-outer longitudinal sides of the parallelograms are parallel to the equatorial plane of the tyre, wherein the axially-outer longitudinal sides of the parallelograms partially coincide with the longitudinal sides of the blocks of the at least one row, and wherein transverse sides of the parallelograms partially coincide with transverse edge profiles of the blocks of the at least one row.

21. The tyre of claim 20, wherein, for each parallelogram, a ratio of a length of a shorter diagonal to a length of a longer diagonal is greater than or equal to 0.50 and less than or equal to 0.70.

22. The tyre of claim 1, wherein the tread comprises a relief pattern comprising two row of blocks delimited by circumferential grooves intersected by transverse grooves, wherein the two rows of blocks are contained in two rows of parallelograms, wherein axially-inner longitudinal sides of the parallelograms are parallel to an equatorial plane of the tyre, wherein the axially-inner longitudinal sides of the parallelograms are equidistant from the equatorial plane of the tyre, wherein axially-outer longitudinal sides of the parallelograms are parallel to the equatorial plane of the tyre, wherein the axially-outer longitudinal sides of the parallelograms partially coincide with the longitudinal sides of respective blocks of the two rows, and wherein transverse sides of the parallelograms partially coincide with transverse edge profiles of the respective blocks of the two rows, and wherein the transverse sides of the parallelograms on one side of the equatorial plane of the tyre are staggered circumferentially with respect to the transverse sides of the parallelograms on an opposite side of the equatorial plane of the tyre by a distance essentially equal to half of a circumferential interval of the transverse sides of the parallelograms.

23. The tyre of claim 22, wherein, for each parallelogram, a ratio of a length of a shorter diagonal to a length of a longer diagonal is greater than or equal to 0.50 and less than or equal to 0.70.

24. The tyre of claim 1, wherein the tread comprises a relief pattern comprising a first row of center blocks and a second row of center blocks, wherein the first row of center blocks is disposed between a first circumferential groove along an equatorial plane of the tyre and a second lateral circumferential groove, wherein the second row of center blocks is disposed between the first circumferential groove and a third lateral circumferential groove, wherein the center blocks of the first row are separated from each other by first transverse grooves having mid-line axes inclined with respect to the equatorial plane of the tyre, and wherein the center blocks of the second row are separated from each other by second transverse grooves having mid-line axes inclined with respect to the equatorial plane of the tyre.

25. The tyre of claim 24, wherein a ratio of an axial width of the two rows of center blocks to a width of the tread measured between edges of the tread is less than or equal to 0.45.

26. The tyre of claim 24, wherein each block of the center rows comprises an identical shape.

27. The tyre of claim 24, wherein the blocks of the two center rows are staggered circumferentially with respect to each other.

28. The tyre of claim 24, wherein, with respect to the equatorial plane of the tyre, the mid-line axes of the first transverse grooves are inclined in an opposite direction to the mid-line axes of the second transverse grooves.

29. The tyre of claim 24, wherein, with respect to the equatorial plane of the tyre, the mid-line axes of the first transverse grooves are inclined in a same direction as the mid-line axes of the second transverse grooves.

30. The tyre of claim 24, further comprising two rows of shoulder blocks, wherein a first row of shoulder blocks is disposed between the second lateral circumferential groove and a first edge of the tread, wherein a second row of shoulder blocks is disposed between the third lateral circumferential groove and a second edge of the tread, wherein the shoulder blocks of the first row are separated from each other by third transverse grooves, and wherein the shoulder blocks of the second row are separated from each other by fourth transverse grooves.

31. The tyre of claim 30, wherein a shape of the blocks of the first shoulder row is a mirror image of a shape of the blocks of the second shoulder row.

32. The tyre of claim 31, wherein the blocks of the first shoulder row are staggered circumferentially with respect to the blocks of the second shoulder row.

33. The tyre of claim 30, wherein a shape of the blocks of the first shoulder row, when rotated through 180° about an axial direction of the tyre, matches a shape of the blocks of the second shoulder row.

34. The tyre of claim 33, wherein the blocks of the first shoulder row are staggered circumferentially with respect to the blocks of the second shoulder row.

35. The tyre of claim 30, wherein each block of the shoulder rows is delimited by longitudinal sides that are parallel to the equatorial plane of the tyre, wherein each block of the shoulder rows is delimited by two transverse sides with curvilinear profiles, and wherein each block of the shoulder rows is delimited by a curvilinear linking profile between an axially-inner longitudinal side and a rear transverse side with respect to the predetermined rolling direction of the tyre.

36. The tyre of claim 30, wherein curvilinear profiles of the first row of center blocks and the first row of shoulder blocks are arranged opposite each other along the second lateral circumferential groove, producing a widening of the second lateral circumferential groove, and wherein curvilinear profiles of the second row of center blocks and the second row of shoulder blocks are arranged opposite each other along the third lateral circumferential groove, producing a widening of the third lateral circumferential groove.

37. The tyre of claim 30, wherein an axial width of the two rows of center blocks is less than an axial width of the two rows of shoulder blocks.

38. The tyre of claim 30, wherein the blocks of the center rows and the shoulder rows comprise sipes.

39. The tyre of claim 38, wherein the sipes of the blocks of the first center row are parallel to each other.

40. The tyre of claim 38, wherein the sipes of the blocks of the second center row are parallel to each other.

41. The tyre of claim 38, wherein the sipes of the blocks of the first and second center rows are parallel to each other.

42. The tyre of claim 38, wherein, with respect to the equatorial plane of the tyre, the sipes of the blocks of the first center row are inclined in an opposite direction to the sipes of the blocks of the second center row.

43. The tyre of claim 38, wherein, with respect to the equatorial plane of the tyre, the sipes of the blocks of the center rows are inclined in an opposite direction to the transverse sides of the blocks of the center rows.

44. The tyre of claim 38, wherein the blocks of the shoulder rows comprise zigzag-shaped sipes.

45. The tyre of claim 38, wherein the sipes of the blocks of the center rows and the sipes of the blocks of the shoulder rows comprise essentially a same depth.

46. The tyre of claim 38, wherein the sipes of the blocks of the center rows, the sipes of the blocks of the shoulder rows, the circumferential grooves, and the transverse grooves comprise essentially a same depth.

47. The tyre of claim 38, further comprising notches;

wherein the notches comprise depths greater than or equal to 20% and less than or equal to 60% of a depth of the sipes.

48. The tyre of claim 47, wherein a ratio of the depth of the notches to the depth of the sipes is 0.25.

49. The tyre of claim 1, wherein the tread comprises a relief pattern comprising two rows of center blocks, two rows of intermediate blocks, and two rows of shoulder blocks, wherein a first row of shoulder blocks is disposed between a first edge of the tread and a first circumferential groove, wherein a first row of intermediate blocks is disposed between the first circumferential groove and a second circumferential groove, wherein a first row of center blocks is disposed between the second circumferential groove and a third circumferential groove, wherein a second row of center blocks is disposed between the third circumferential groove and a fourth circumferential groove, wherein a second row of intermediate blocks is disposed between the fourth circumferential groove and a fifth circumferential groove, wherein a second row of shoulder blocks is disposed between the fifth circumferential groove and a second edge of the tread, wherein the shoulder blocks of the first row are separated from each other by first transverse grooves, wherein the intermediate blocks of the first row are separated from each other by second transverse grooves, wherein the center blocks of the first row are separated from each other by third transverse grooves having mid-line axes inclined with respect to an equatorial plane of the tyre, wherein the center blocks of the second row are separated from each other by fourth transverse grooves having mid-line axes inclined with respect to the equatorial plane of the tyre, wherein the intermediate blocks of the second row are separated from each other by fifth transverse grooves, and wherein the shoulder blocks of the second row are separated from each other by sixth transverse grooves.

50. The tyre of claim 49, wherein, in a row of intermediate blocks, each block comprises an identical shape.

* * * * *